United States Patent
Wang

(10) Patent No.: US 8,193,751 B2
(45) Date of Patent: Jun. 5, 2012

(54) WINDOW COVERING DRIVING DEVICE

(75) Inventor: Jin You Wang, Guangdong (CN)

(73) Assignee: Shenzhen Bofu Mechanic & Electronics Co., Ltd., Shenzhen (CN)

( * ) Notice: Subject to any disclaimer, the term of this patent is extended or adjusted under 35 U.S.C. 154(b) by 583 days.

(21) Appl. No.: 12/261,831

(22) Filed: Oct. 30, 2008

(65) Prior Publication Data
US 2009/0223639 A1  Sep. 10, 2009

(30) Foreign Application Priority Data

Jul. 11, 2007  (CN) ................ 2007 2 0170605 U

(51) Int. Cl.
*G05B 5/00* (2006.01)

(52) U.S. Cl. ........ 318/466; 318/455; 318/467; 318/468; 318/470

(58) Field of Classification Search .......... 318/466, 318/445, 467, 468, 470
See application file for complete search history.

(56) References Cited

U.S. PATENT DOCUMENTS

| | | | | |
|---|---|---|---|---|
| 5,642,022 A | * | 6/1997 | Sanz et al. | 318/468 |
| 5,661,385 A | * | 8/1997 | McEwan | 318/478 |
| 5,912,537 A | * | 6/1999 | Yang | 318/280 |
| 6,037,675 A | * | 3/2000 | Yoshida et al. | 307/10.2 |
| 6,082,433 A | * | 7/2000 | Vafaie et al. | 160/310 |
| 6,657,316 B1 | * | 12/2003 | Smith et al. | 307/10.1 |
| 7,030,509 B2 | * | 4/2006 | Okada et al. | 307/10.1 |
| 7,173,516 B2 | * | 2/2007 | Mullet et al. | 340/5.71 |

* cited by examiner

*Primary Examiner* — Walter Benson
*Assistant Examiner* — David Luo
(74) *Attorney, Agent, or Firm* — IPro, Inc.; Na Xu

(57) ABSTRACT

A window covering driving device includes a motor and a control circuit, the control circuit is provided with a microprocessor, a control wire, a control signal input terminal, and a switching circuit and the motor is connected to a drive power supply via the switching circuit. The switching circuit is connected to the microprocessor and the control signal input terminal is connected to the microprocessor via the control wire. A safety position limiting wire is also included with one end of the safety position limiting wire being connected to the microprocessor and the other end is connected to a safety position limiting signal control terminal. The safety position limiting wire and safety position limiting signal control terminal are attached so that, when the safety position limiting signal control terminal is at the position limiting state, as the motor runs to the position limiting position, it will automatically stop.

8 Claims, 4 Drawing Sheets

# WINDOW COVERING DRIVING DEVICE

FIELD OF THE INVENTION

The present invention involves a window covering driving device, particularly involves a window covering driving device controlled by a circuit.

BACKGROUND OF THE INVENTION

An existing window covering driving device generally comprises a motor and a motor control segment; the motor control segment is divided into two kinds, mechanical control and circuit control; the structure of a mechanical control segment is comparatively complicated, which requires a quite fine manufacturing technology, and is easy to wear, so, more and more manufacturers use a circuit to control the operating of the drive motor of a window covering. The control circuit of an existing window covering drive motor generally comprises a microprocessor, a control wire, a control button, and a switching circuit; the drive motor is connected to a drive power supply via the switching circuit; the switching circuit is connected to the microprocessor; the control button is connected to the microprocessor via the control wire; the control button can separately control the motor to run in clockwise or counterclockwise direction This kind of window covering drive motor generally can only control the window covering to roll up and fall down between a up limit point and a down limit point, but in practical using processes, especially in some special conditions, for avoid potential safety hazards, such as in conditions of the rising and falling of a car window covering, or the rising and failing of a control room window covering, a certain position point (we call this point as the critical point of safety position) need to be set between said up limit point and said down limit point to stop the motor; if the rising and falling of these window coverings are not limited, it may lead to the rising up or falling down of the window covering, once the control button is triggered by incorrect manipulation, which will block the view of the operator, and will lead to the occurring of safety accidents.

SUMMARY OF THE INVENTION

The technical problem of the present invention to solve is to provide a window covering driving device that can do safety position limiting to the rising and falling of a window covering.

The window covering driving device of the present invention comprises a motor and a control circuit; the control circuit is provided with a microprocessor, a control wire, a control signal input terminal, and a switching circuit; the motor is connected to a drive power supply via the switching circuit; the switching circuit is connected to the microprocessor; the control signal input terminal is connected to the microprocessor via the control wire; wherein, it also comprises a safety position limiting wire; one end of the safety position limiting wire is connected to the microprocessor, and the other end is connected to a safety position limiting signal control terminal.

The safety position limiting signal control terminal is high level at the safety position limiting state. Under this circumstance, only when the safety position limiting signal control terminal is high level, the safety position limiting will work, and when the safety position limiting signal control terminal is low level, the safety position limiting will not work. Of course, the safety position limiting signal control terminal can also be set at the safety position limiting state when it is low level.

The safety position limiting signal control terminal is a signal control switch. So, whether the safety position limiting signal control terminal is at the safety position limiting state or not can be controlled by the switch.

The safety position limiting signal control terminal is an ignition switch of a motor vehicle. So, when the motor vehicle is ignited, the safety position limiting signal control terminal is high level, and it is at the safety position limiting state; at this time, if incorrect manipulations occur to the car window covering, such as dropping the window covering, the motor will automatically stop as it gets to the safety position limiting, so as not to block the view of the driver, which will lead to the occurring of safety accidents.

At least two safety position limiting wires are provided, and they are separately connected to at least two safety position limiting signal control terminals. So, multiple motor stroke safety position limiting points can be provided.

The motor is a tubular motor; the motor and the control circuit are located in a case; the control wire and the safety position limiting wire are led out from the case, and they are separately connected to the control signal input terminal and the safety position limiting signal control terminal outside the case. A tubular motor is a most desirable motor to implement driving the window covering.

The control signal input terminal is a control button, which is located outside the case. In this way, the user can implement controlling the motor stroke by directly operating the control button on the case.

Two control buttons are provided, and two corresponding control wires are provided. So, the two buttons can separately be used to control the going up or going down of the motor; the operation is intuitionistic and intelligible.

The control signal input terminal is a remote control device; the remote control device comprises a transmitting circuit and a receiving circuit; the control wire is connected to the receiving circuit of the remote control device. This way implements controlling the going up or going down of the motor by remote control.

The control circuit also comprises a safety position critical point configuring wire, and a safety position critical point configuring signal input terminal; one end of the safety position critical point configuring wire is connected to the microprocessor, and the other end is connected to a stroke safety position critical point configuring signal input terminal. So, the users can set a safety position critical point by themselves according to their own requirements.

For the safety position limiting wire and safety position limiting signal control terminal are attached in the present invention, when the safety position limiting signal control terminal is at the position limiting state, as the motor runs to the safety position limiting position, it will automatically stop; so, in the situations of the occurring of incorrect manipulations, the running stroke of the motor can be limited to ensure that the window covering can only rise or fall to a certain position, so as to avoid the window covering to block the view of the operator, which will to the occurring of safety accidents.

DESCRIPTION OF THE PREFERRED EMBODIMENT

The present invention is best understood from the following detailed description with reference to the accompanying figures and preferred embodiments

Embodiment 1

Figure 1:
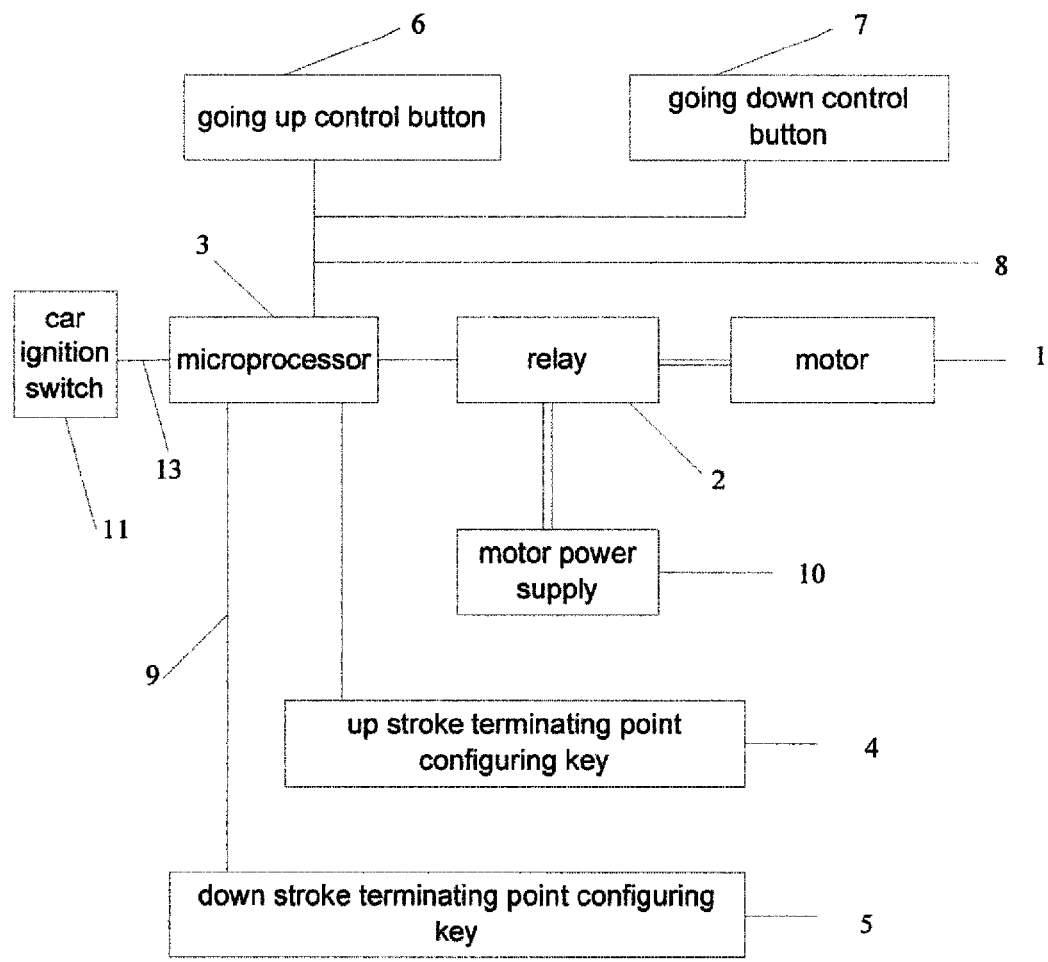
FIG. 1 is a schematic diagram of the circuit structure of the electronic type tubular motor in the embodiment 1.

Referring to FIG. 1, the window covering driving device adopted in the present embodiment is an electronic type tubular motor, and it comprises a motor 1, a case, a control circuit; the control circuit comprises a microprocessor 3, a going up control button 6, a going down control button 7 (for a DC motor, the going up or going down of the movement direction of the motor can also be changed by switching the direction of the power supply), a button control wire 8, a relay 2 (namely a switching circuit), an up stroke terminating point configuring key 4, a down stroke terminating point configuring key 5, a stroke terminating point configuring wire 9, a safety position limiting wire 13, and a car ignition switch 11; the microprocessor 3, the relay 2, and the motor 1 are located in the case; the motor 1 is connected to a power supply 10 via the relay 2, and the relay 2 is connected to the microprocessor 3; the going up control button 6 and the going down control button 7 are connected to the microprocessor 3 via the control wire 8; the up stroke terminating point configuring key 4 and the down stroke terminating point configuring key 5 are connected to the microprocessor 3 via the stroke terminating point configuring wire 9. The car ignition switch 11 is connected to the microprocessor 3 via the safety position limiting wire 13. The going up control button 6 and the going down control button 7 are located outside the case; the up stroke terminating point configuring key 4 and the down stroke terminating point configuring key 5 are fixed to the pipe body or end cap of the tubular motor. The up stroke terminating point configuring key 4 and the down stroke terminating point configuring key 5 are located in the hole of the pipe body or the end cap of the tubular motor.

Figure 2:
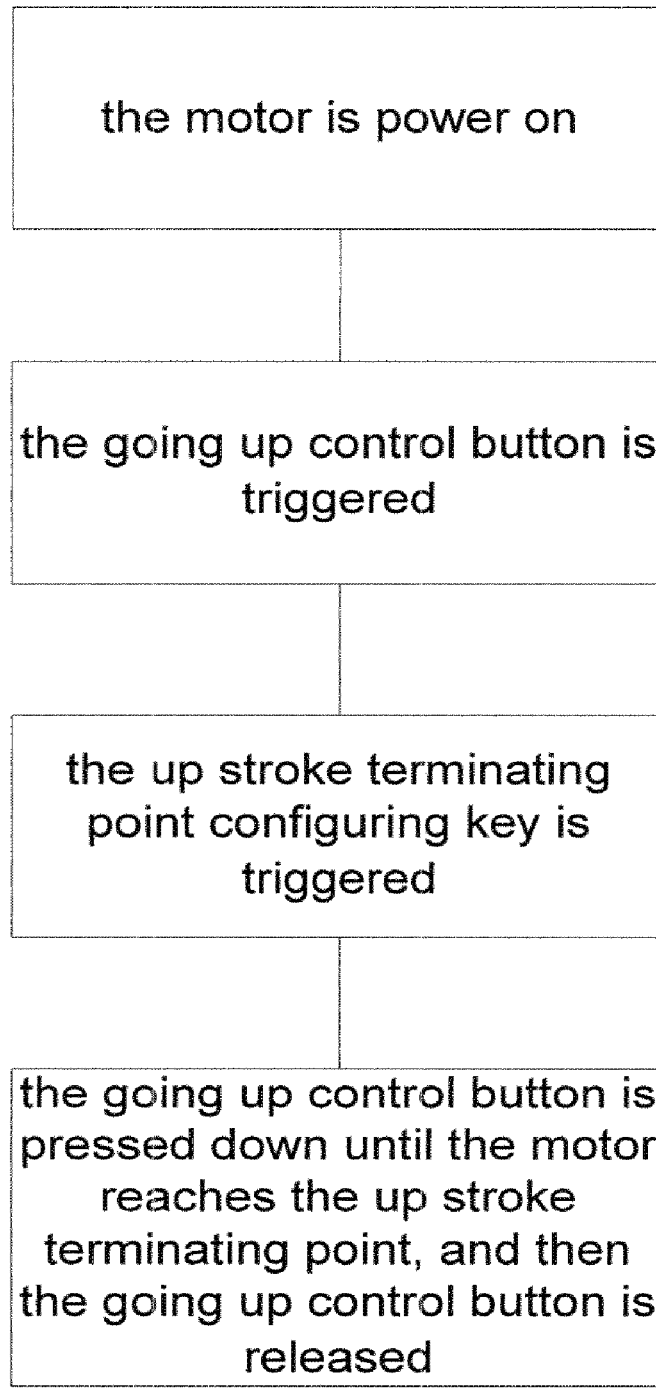
FIG. 2 is a flow chart of the configuring steps of the up stroke terminating point in the embodiment 1.

With reference to FIG. 2, the configuring steps of the up stroke terminating point is described here:

1. the motor is power on;
2. the going up control button is triggered;
3. the up stroke terminating point configuring key is triggered (this triggering is better to hold on for a while to cause a delay, so as to avoid some incorrect manipulations);
4. the going up control button is pressed down until the motor reaches the up stroke terminating point, and then the going up control button is released. Now the data of the up stroke terminating point configuration are stored into the microprocessor, so as to complete the configuring of the up stroke terminating point.

The configuring steps of the down stroke terminating point is the same as above mentioned, and the difference is that the stroke control button and the stroke terminating point configuring key which are triggered are different.

Figure 3:
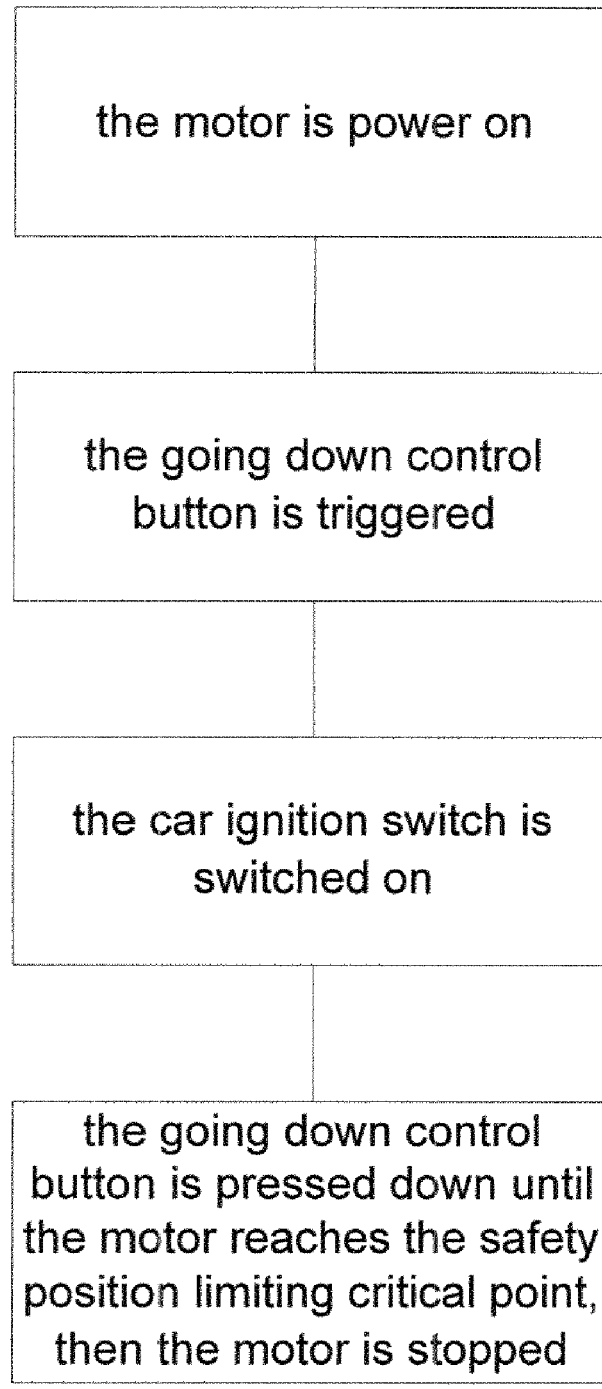
FIG. 3 is a flow chart of the configuring steps of the safety position limiting critical point in the embodiment 1.

Then referring to FIG. 3, the configuring of the safety position limiting critical point is described in brief:

1. the motor is power on;
2. the going down control button is triggered;
3. the car ignition switch is switched on;
4. the going down control button is pressed down until the motor reaches the safety position limiting critical point, then the motor is stopped. (The window covering of a car is generally fixed at the upper part of the car window, so the safety position limiting critical point is only needed to be configured when the window covering is going down, that is, it is configured corresponding to the down stroke movement direction of the motor.)

In this way, the configuring of the safety position limiting critical point is completed. Later, as the safety position limiting signal control switch is at the position limiting state, during the motor is running in the down stroke direction, it will automatically stop if it runs to the safety position limiting critical point. In this way, even if the going down control button is triggered by incorrect manipulation, the falling of the car window covering (especially the front car window covering) will automatically stop as it gets to the safety position limiting critical point, which will not block the view of the driver, so as to avoid the occurring of traffic accidents.

Embodiment 2

Figure 4:
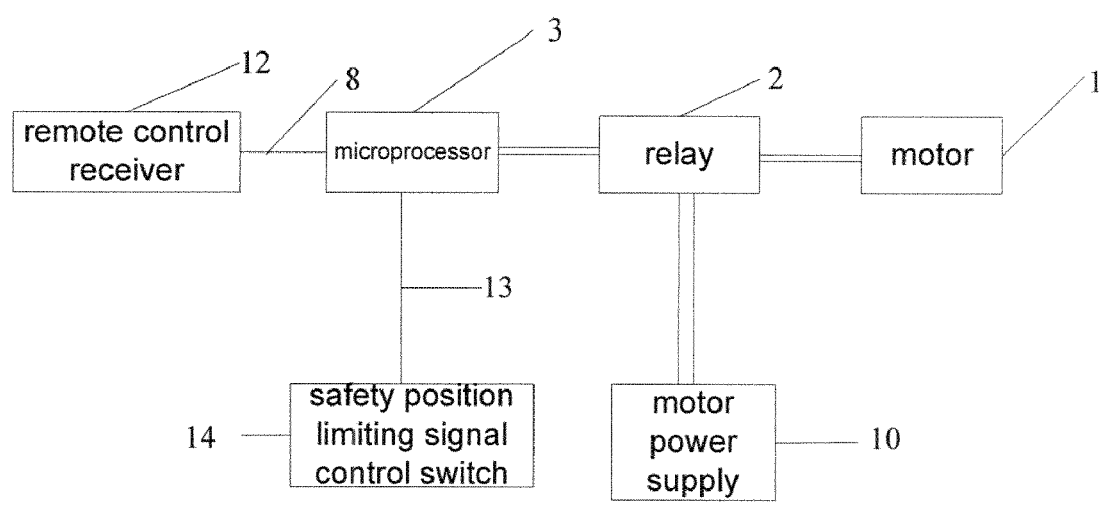
FIG. 4 is a schematic diagram of the circuit structure of the electronic type tubular motor in the embodiment 2.

Referring to FIG. 4, the window covering driving device adopted in the present embodiment is an electronic type tubular motor, and it comprises a motor 1, a case, a control circuit; the control circuit comprises a microprocessor 3, a remote control receiver 12, a control wire 8, a relay 2 (namely a switching circuit), a safety position limiting wire 13, and a safety position limiting signal control switch 14; the microprocessor 3, the relay 2, and the motor 1 are located in the case; the motor 1 is connected to a power supply 10 via the relay 2, and the relay 2 is connected to the microprocessor 3; the remote control receiver 12 is connected to the microprocessor 3 via the control wire 8. The safety position limiting signal control switch 14 is connected to the microprocessor 3 via the safety position limiting wire 13. The remote control receiver 12 is fixed inside or outside the case of the tubular motor.

The difference between the present embodiment and the Embodiment 1 is that: the operating of the motor is controlled by a remote controller, which is divided into two parts, the emitter and the receiver, and the receiver is located inside or outside the case of the tubular motor; no stroke terminating point configuring key is provided; in the present embodiment, the configuring of the stroke terminating point and the configuring of the safety position limiting critical point can all be configured in advance in the microprocessor, which does not need to be configured by the users themselves, so it also does not need corresponding configuring keys, and this is easy to implement for the drive motors of window coverings of the same type cars which are produced in bulk; the safety position limiting signal control terminal is a switch, so as to control the motor to be or not be at the safety position limiting state by switching the switch, so it can be used in many occasions that need to configure a safety position limiting critical point to the electronic type tubular motor.

The preferred embodiments described here are merely examples to explain the invention and are not intended to limit the present invention. For those skilled in the art, all the modifications and changes according to the characteristic and spirit of the present invention, such as: replacing the tubular motor with other motors, being provided with more than two safety position limiting critical points, or replacing the relay with other switching circuits, are involved in the protected scope of the invention.

What is claimed is:

1. A window covering driving device comprising a motor and a control circuit, the control circuit being provided with a microprocessor, a control wire, a control signal input terminal, and a switching circuit, the motor being connected to a drive power supply via the switching circuit, the switching circuit being connected to the microprocessor, the control signal input terminal being connected to the microprocessor via the control wire, characterized in that it also comprises a safety position limiting wire; one end of the safety position limiting wire is connected to the microprocessor, and the other end is connected to a configurable safety position limiting signal control terminal, wherein the safety position limiting signal control terminal is high level at the safety position limiting state and configurable so as to adjust a safety position critical point, and wherein the safety position limiting signal control terminal is a signal control switch.

2. The window covering driving device of claim 1, characterized in that the safety position limiting signal control terminal is an ignition switch of a motor vehicle.

3. The window covering driving device of claim 2, characterized in that the motor is a tubular motor; the motor and the control circuit are located in a case; the control wire and the safety position limiting wire are led out from the case, and they are separately connected to the control signal input terminal and the safety position limiting signal control terminal outside the case.

4. The window covering driving device of claim 3, characterized in that the control signal input terminal is a control button, which is located outside the case.

5. The window covering driving device of claim 4, characterized in that two control buttons are provided, and two corresponding control wires are provided.

6. The window covering driving device of claim 3, characterized in that the control signal input terminal is a remote control device; the remote control device comprises a transmitting circuit and a receiving circuit; the control wire is connected to the receiving circuit of the remote control device.

7. The window covering driving device of claim 1, characterized in that at least two safety position limiting wires are provided, and they are separately connected to at least two safety position limiting signal control terminals.

8. A window covering driving device comprising a motor and a control circuit, the control circuit being provided with a microprocessor, a control wire, a control signal input terminal, and a switching circuit, the motor being connected to a drive power supply via the switching circuit, the switching circuit being connected to the microprocessor, the control signal input terminal being connected to the microprocessor via the control wire, characterized in that the window covering driving device also comprises a safety position critical point configuring wire, and a safety position critical point configuring signal input terminal; one end of the safety position critical point configuring wire is connected to the microprocessor, and the other end is connected to the safety position critical point configuring signal input terminal such that a safety position critical point can be configured.

* * * * *